United States Patent [19]

Maresca

[11] Patent Number: 4,877,848

[45] Date of Patent: Oct. 31, 1989

[54] THERMOPLASTIC BLENDS CONTAINING POLYAMIDE AND EPOXY FUNCTIONAL COMPOUND

[75] Inventor: Louis M. Maresca, Pittsfield, Mass.

[73] Assignee: General Electric Company, Pittsfield, Mass.

[21] Appl. No.: 325,061

[22] Filed: Mar. 14, 1989

Related U.S. Application Data

[63] Continuation of Ser. No. 812,434, Dec. 23, 1985, abandoned.

[51] Int. Cl.$^4$ .............................................. C08L 77/00
[52] U.S. Cl. ..................................... 525/423; 525/425; 525/430; 525/433
[58] Field of Search ................................ 525/423, 433

[56] References Cited

U.S. PATENT DOCUMENTS

| | | | |
|---|---|---|---|
| 4,052,481 | 10/1977 | Asahara et al. | 525/425 |
| 4,317,891 | 3/1982 | Sakano et al. | 525/66 |
| 4,430,484 | 2/1984 | Quinn | 525/425 |
| 4,536,541 | 8/1985 | Latham | 525/66 |

FOREIGN PATENT DOCUMENTS

| | | | |
|---|---|---|---|
| 0106241 | 4/1984 | European Pat. Off. | |
| 46-20268 | 6/1971 | Japan | 525/425 |
| 51030255 | 9/1974 | Japan | |
| 51054657 | 11/1974 | Japan | |
| 51-30256 | 3/1976 | Japan | 525/425 |
| 53-127551 | 7/1978 | Japan | |
| 55050061 | 10/1978 | Japan | |
| 55-133446 | 4/1979 | Japan | |
| 55-142049 | 4/1979 | Japan | |
| 55-50061 | 4/1980 | Japan | |
| 0078051 | 6/1980 | Japan | 525/425 |
| 55-78051 | 6/1980 | Japan | |
| 59-68368 | 4/1984 | Japan | |
| 0105050 | 6/1984 | Japan | 525/425 |
| 0193955 | 11/1984 | Japan | 525/425 |
| 0055054 | 3/1985 | Japan | 525/423 |
| 60-217260 | 10/1985 | Japan | |
| 61-183353 | 8/1986 | Japan | |

*Primary Examiner*—John C. Bleutge
*Assistant Examiner*—A. Carrillo
*Attorney, Agent, or Firm*—Spencer D. Conard

[57] ABSTRACT

Thermoplastic blends of polyamide with a resin selected from the group consisting of polycarbonate, poly(ester-carbonate), and polyarylate have improved physical properties with the incorporation therein of an epoxy functional compatibilizing agent.

6 Claims, No Drawings

THERMOPLASTIC BLENDS CONTAINING POLYAMIDE AND EPOXY FUNCTIONAL COMPOUND

This is a continuation, of application Ser. No. 812,434 filed 12/23/85, now abandoned.

The present invention relates to thermoplastic resin blends containing a polyamide resin and a polyester or polycarbonate resin. More particularly, the present invention relates to thermoplastic resin blends containing polyamide resin, at least one resin selected from the group of polycarbonate, poly(ester-carbonate), and polyarylate; and an epoxy functional compatibilizing agent.

BACKGROUND OF THE INVENTION

Polycarbonates, poly(ester-carbonates), and polyarylates are well known thermoplastic materials which, due to their many advantageous physical properties, find use as thermoplastic engineering materials in many commercial and industrial applications. These resins, for example, exhibit excellent properties of toughness, flexibility, impact strength, optical clarity, and heat resistance. All such resins may generally be prepared by the reaction of a dihydric phenol, such as bisphenol-A, with a carbonate precursor or an aromatic dicarboxylic acid.

These resins, particularly polycarbonate, have been blended with polyamide resin to produce blends having various modified properties. Japanese Kokai No. 116541/50 discloses blends of 5-20% by weight nylon 12 and 80-95% by weight polycarbonate for use in electric insulators. Japanese Pat. Kokai No. 85420/56 discloses polyamide fibers containing 0.5-10% by weight polycarbonate. Japanese Pat. Publn. No. 26936/76 discloses adhesive compositions containing 5-40% by weight of polycarbonate resin and 95-60% by weight of polyamide resin. Japanese Pat. Kokai No. 61050/55 discloses molding compositions containing 100 weight parts poly(ester-carbonate) and 1-150 weight parts polyamide. U.S. Pat. No. 4,317,891, Sakano, et al., discloses thermoplastic blends containing polycarbonate, polyamide, and conjugated diene rubber copolymer.

These disclosed blends are useful for their intended and described purposes. However, it is well known that such blends by no means live up to expectations in either the combination of physical properties present or the level of physical properties attained. Ductility and impact strength are poor. Elongation to break is at marginally useful levels for ordinary purposes. It is theorized that there blends lack the degree of compatibility necessary for each resin to contribute the excellent physical properties that it may possess to the blend as a whole.

Thus, it is an object of the present invention to produce blends of polycarbonate, poly(ester-carbonate), and/or polyarylate with polyamide having improved ductility, impact strength, and elongation to break.

It is another object of the present invention to produce blends of polycarbonate, poly(ester-carbonate), and/or polyarylate with polyamide having improved compatibility.

It is a further object of the present invention to improve the ductility, impact strength and elongation to break of polycarbonate, poly(ester-carbonate), and/or polyarylate blends with polyamide by the addition of an effective amount of a reactive epoxy functional material.

Finally, it is an object of the present invention to improve the compatibility of polycarbonate, poly(ester-carbonate), and/or polyarylate blends with polyamide by the addition of an epoxy functional compatibilizing agent.

DETAILED DESCRIPTION OF THE INVENTION

Briefly, according to the present invention, there are provided thermoplastic blends containing polyamide with polycarbonate, poly(ester-carbonate), and/or polyarylate having unexpectedly improved properties, i.e., solvent resistance, ductility, flow, and resistance to brittle failure which blends comprise:

(i) at least one resin selected from the group consisting of polycarbonate, poly(ester-carbonate), and polyarylate;
(ii) polyamide resin; and
(iii) an effective amount of a reactive epoxy functional compatibilizing agent.

Polycarbonate resins suitable for use herein can be prepared by reacting a dihydric phenol with a carbonate precursor, such as phosgene, a haloformate or a carbonate ester. Generally speaking, such carbonate polymers may be typified as possessing recurring structural units of the formula:

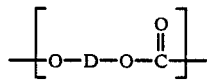

wherein D is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. The preferred polycarbonate resin for use herein is a homopolymer derived from 2,2-bis(4-hydroxyphenyl)propane and a carbonate precursor.

These aromatic polycarbonates can be manufactured by known processes, such as, for example and as mentioned above, by reacting a dihydric phenol with a carbonate precursor, such as phosgene, in accordance with methods set forth in U.S. Pat. Nos. 4,018,750 and 4,123,436; or by transesterification processes such as are disclosed in U.S. Pat. No. 3,154,008, as well as other processes known to those skilled in the art.

Poly(ester-carbonate) resin usually employed may generally be described as polymers comprising recurring carbonate groups,

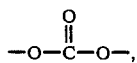

carboxylate groups,

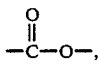

and aromatic carbocyclic groups in the linear polymer chain, in which at least some of the carboxylate groups and at least some of the carbonate groups are bonded directly to ring carbon atoms of the aromatic carbocyclic groups. These poly(ester-carbonate) polymers in general, are prepared by reacting an aromatic difunctional carboxylic acid or ester forming derivative, a dihydric phenol and a carbonate precursor.

The preparation of poly(ester-carbonates) which may be employed in the compositions of the present invention is described in U.S. Pat. Nos. 3,030,331; 3,169,121; 3,207,814; 4,194,038 and 4,156,069 incorporated herein by reference.

The poly(ester-carbonates) which are preferred in the practice of the present invention include the aromatic polyestercarbonates derived from dihydric phenols, aromatic dicarboxylic acids or their reactive ester forming derivatives such as the aromatic diacid halides, and phosgene. A particularly useful class of aromatic poly(ester-carbonates) is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the poly(ester-carbonate) is generally from about 25 to 90 mole percent and preferably about 35 to 80 mole percent. The molar range of terephthalate units, the remainder of the copolymer ester units preferably comprising isophthalate units is generally from about 2 to about 90 percent, and preferably from about 5 to about 50 percent.

Polyarylate resin employed herein is aromatic polyester containing carboxylate groups,

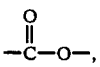

and aromatic carbocyclic groups in the linear polymer chain, in which at least some of the carboxylate groups join directly ring carbon atoms of the aromatic carbocyclic groups. The polyarylate polymers, in general, are prepared by reacting an aromatic difunctional carboxylic acid or ester forming derivative thereof, and a dihydric phenol. Of course, polyarylates may be polymerized from a carboxylic acid/hydroxy functional monomer in a head-tail arrangement.

A preferred polyarylate contains a dihydric phenol and a difunctional carboxylic acid. The difunctional carboxylic acid portion contains from about 95 to 0 mole percent of terephthalic acid and from about 5 to about 100 mole percent of isophthalic acid. More preferably, such polyarylates contain a mixture of from about 30 to about 70 mole percent terephthalic acid and from about 70 to about 30 mole percent of isophthalic acid. A polyarylate containing a mixture of 50 mole percent of terephthalic acid and 50 mole percent isophthalic acid is common. In general, these and other suitable polyarylates have a reduced viscosity of from about 0.4 to about 1.0 as measured in p-chlorophenol at 49° C. (0.2 g/100 ml.).

The polyarylates of the present invention can be prepared by any of the well known prior art polyester forming reactions, such as the reaction of the acid chlorides of the aromatic dicarboxylic acids with the dihydric phenol, the reaction of the diaryl esters of the aromatic dicarboxylic acids with the dihydric phenols, and the reaction of the aromatic diacids with diester derivatives of dihydric phenol. These processes are described in, for example, U.S. Pat. Nos. 3,317,464; 3,948,856; 3,780,148; 3,824,213 and 3,133,898.

Typical dihydric phenols useful in formulating the polycarbonate, poly(ester-carbonate), or polyarylate resins as described above may be represented by the general formula:

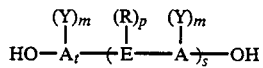

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidene, and generally from one to twelve carbon atoms, inclusive, etc. Where E is an alkylene or alkylidene group, it may also consist of two or more alkylene or alkylidene groups, connected by a non-alkylene or non-alkylidene group, such as an aromatic linkage, a tertiary amino linkage, an ether linkage, a carbonyl linkage, a silicon-containing linkage, or by a sulfur-containing linkage such a sulfide, sulfoxide, sulfone, etc. In addition, E may be a cycloaliphatic group of five to seven carbon atoms, inclusive (e.g. cyclopentyl, cyclohexyl), or a cycloalkylidene of five to seven carbon atoms, inclusive, such as cyclohexylidene; a direct bond; a sulfur-containing linkage, such as sulfide, sulfoxide or sulfone; an ether linkage; a carbonyl group; a tertiary nitrogen group; or a silicon-containing linkage such as silane or siloxy. Other groups which E may represent will occur to those skilled in the art. R is hydrogen or a monovalent hydrocarbon group such as alkyl of one to eight carbon atoms, inclusive (methyl, ethyl, propyl, etc.); aryl (phenyl, naphthyl, etc.); aralkyl (benzyl, ethylphenyl, etc.); or cycloaliphatic of five to seven carbon atoms, inclusive (cyclopentyl, cyclohexyl, etc.). Y may be inorganic atom such as chlorine, bromine, fluorine, etc; an organic group such as the nitro group, etc.; an organic group such as R above; or an oxy group such as OR, it being only necessary that Y be inert to and unaffected by the reactants and the reaction conditions. The letter s is any whole number from and including zero to twenty; m is any whole number from and including zero through the number of positions on A available for substitution; p is any whole number from and including zero through the number of available positions on E; and t is a whole number equal to at least one.

In the typical dihydric phenol compound represented by Formula I above, when more than one Y substituent is present, they may be the same or different. The same is true for the R substituent. Where s is greater than one, E can be the same or different. Where E is a direct bond, the aromatic rings are directly joined with no intervening alkylene or other bridge. The positions of the hydroxyl groups and Y on the aromatic nuclear residues, A, can be varied in the ortho, meta, or para positions; and the groupings can be in a vicinal, nonsymmetrical or symmetrical relationship, where two or more ring carbon atoms of the aromatic hydrocarbon residue are substituted with Y and a hydroxyl group.

Examples of dihydric phenol compounds that may be employed in the above polymers include:
2,2-bis-(4-hydroxyphenyl)propane, (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxynaphthyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexylmethane;
1,2-bis-(4-hydroxyphenyl)-1,2-bis-(phenyl)propane;
2,2-bis-(4-hydroxyphenyl)-1-phenylpropane; and the like. Also included are dihydroxybenzenes typified by hydroquinone and resorcinol;
dihydroxydiphenyls such as 4,4'-dihydroxydiphenyl; 2,2'-dihydroxydiphenyl; 2,4'-dihydroxydiphenyl; dihydroxy-naphthalenes such as 2,6-dihydroxynaphthalene, etc.

Also useful are dihydric phenols wherein E is a sulfur-containing radical such as the dihydroxy aryl sulfones exemplified by: bis-(4-hydroxyphenyl)sulfone; 2,4'-dihydroxydiphenyl sulfone; bis-(3,5-dimethyl-4-hydroxyphenyl) sulfone; 5'-chloro-2,4'-dihydroxydiphenyl sulfone; 3-chloro-bis-(4-hydroxyphenyl) sulfone; and 4,4'dihydroxytriphenyldisulfone; etc. The preparation of these and other useful sulfones are described in U.S. Pat. No. 2,288,282. Hydroxy terminated polysulfones as well as substituted sulfones using halogen, nitrogen, alkyl radicals, etc., are also useful.

Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:
4,4'-dihydroxydiphenyl ether;
4,4'-dihydroxytriphenyl ether;
the 4,3'-, 4,2'-, 4,1'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
6,6'-dihydroxydinaphthyl-2,2'-ether;
6,6'-dihydroxy-5,5'-dichlorodinaphthyl-2,2'-ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed, and where dihydric phenol is mentioned herein mixtures of such materials are considered to be included. Other dihydric phenols which are suitable for the preparation of the above described polymers are disclosed in U.S. Pat. Nos. 2,999,835; 3,028,365; 3,334,154; 4,131,575.

In general, any aromatic difunctional carboxylic acid or its reactive derivative, such as acid halide, conventionally used in the preparation of polyesters, may be used for the preparation of the poly(ester-carbonates) or polyarylates described above. The difunctional aromatic carboxylic acids which may be used include the aliphatic-aromatic carboxylic acids, in addition to the wholly aromatic carboxylic acids. Of course, skilled practitioners will recognize that some small percentage by number of the difunctional carboxylic acid may be difunctional aliphatic carboxylic acid. However, the use of such aliphatic carboxylic acids should not be to such a degree that desirable characteristics associated with aromatic carboxylic acids are substantially reduced. The aromatic dicarboxylic acids or their reactive derivatives, such as the aromatic diacid halides, produce poly(ester-carbonate) and polyarylate which are most useful from the standpoint of physical properties.

The aromatic difunctional carboxylic acids may be represented by the general formula:

$$HOOC—R^1—COOH \qquad II$$

wherein $R^1$ represents an aromatic radical such a phenylene, naphthylene, biphenylene, substituted phenylene, etc.; two or more aromatic groups connected through non-aromatic linkages such as those defined by E in Formula I; or a divalent aliphatic-aromatic hydrocarbon radical such as an aralkyl or alkaryl radical. For purposes of the present invention, the aromatic dicarboxylic acids or their reactive derivatives such as, for example, the acid halides or diphenyl esters, are preferred. Thus, in the preferred aromatic difunctional carboxylic acids, as represented by Formula II, $R^1$ is an aromatic radical such as phenylene, biphenylene, naphthylene, substituted phenylene, etc. Some nonlimiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acids, and isomeric naphthalene dicarboxylic acids. The aromatics may be substituted with Y groups in the same manner as the Formula I aromatics are substituted. Of course, these acids may be used individually or as mixtures of two or more different acids.

The carbonate precursor used above to produce the polycarbonate or poly(ester-carbonate) resins may be either a carbonyl halide, a carbonate ester, or a haloformate. The carbonyl halides which can be employed herein are carbonyl chlorides and carbonyl bromides. Typical of the carbonate esters are diphenyl carbonate, di(halophenyl)carbonates such as di(chlorophenyl)carbonate, di(bromophenyl)carbonate, di(trichlorophenyl)carbonate, di(tribromophenyl)carbonate, etc., di(alkylphenyl)carbonates such as di(tolyl)carbonate, di(naphthyl)carbonate, di(chloronaphthyl)carbonate, phenyltolyl carbonate, chloronaphthyl chlorophenyl carbonate, and the like. The haloformates suitable for use herein include bishaloformates of dihydric, phenols such as bischloroformates of hydroquinone, etc., or glycols such as bis-haloformates of ethylene glycol, neopentyl glycol, polyethylene glycol, etc. While other carbonate precursors will occur to those skilled in the art, carbonyl chloride, also know as phosgene, is preferred.

Polyamides suitable for the present invention may be obtained by polymerizing a monoamino-monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative thereof, for example, an ester or acid chloride. The term "substantially equimolecular" proportions (of the diamine and of the dicarboxylic acid) is used to cover both strict equimolecular proportions and slight departures therefrom which are involved in conventional techniques for stabilizing the viscosity of the resultant polyamides.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned: aminocaproic acid, butyrolactam, pivalolactam, caprolactam, capryllactam, enantholactam, undecanolactam, dodecanolactam and 3- and 4-aminobenzoic acids.

Diamines suitable for use in the preparation of the polyamides include the straight chain and branched, alkyl, aryl and alkyl-aryl diamines. Such diamines include, for example, those represented by the general formula:

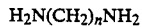

$H_2N(CH_2)_nNH_2$ wherein n is an integer of from 2 to 16, such as trimethylenediamine, tetramethylenediamine, pentamethylenediamine, octamethylenediamine and especially hexamethylenediamine, as well as trimethyl hexamethylene diamine, meta-phenylene diamine, para-phenylene diamine, meta-xylene diamine, para-xylene diamine and the like.

The dicarboxylic acids may be aromatic, for examples as described in Formula II above, or aliphatic dicarboxylic acids of the formula:

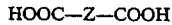

HOOC—Z—COOH wherein Z represents a divalent aliphatic group containing at least 2 carbon atoms. Examples of such acids are sebacic acid, octadecanedoic acid, suberic acid, glutaric acid, pimelic acid and adipic acid.

The polyamide of the blend may be either crystalline, amorphous, or of mixed phase. Typical examples of the polyamides, or nylons, as these are often called, include for example, polyamides 6, 6/6, 11, 12, 6/3, 6/4, 6/10 and 6/12; polyamides resulting from terephthalic acid and/or isophthalic acid and trimethyl hexamethylene diamine; polyamides resulting from adipic acid and meta xylylenediamines; polyamides resulting from adipic acid, azelaic acid and 2,2-bis-(p-aminocyclohexyl)propane; and polyamides resulting from terephthalic acid and 4,4'-diaminodicyclohexylmethane. Mixtures and/or copolymers of two or more of the foregoing polyamides or prepolymers thereof, respectively, are also within the scope of the present invention.

It is also to be understood that the use of the term "polyamides" herein and in the appended claims is intended to include the toughened or super tough polyamides. Super tough polyamides, or super tough nylons, as they are more commonly known, are available commercially, e.g. from E. I. DuPont under the tradename Zytel ST, or may be prepared in accordance with a number of U.S. Patents including, among others, Epstein—U.S. Pat. No. 4,174,358; Novak—U.S. Pat. No. 4,474,927; Roura—U.S. Pat. No. 4,346,194; and Joffrion—U.S. Pat. No. 4,251,644, herein incorporated by reference. These super tough nylons are prepared by blending one or more polyamides with one or more polymeric or copolymeric elastomeric toughening agents. Suitable toughening agents are disclosed in the above-identified U.S. Patents as well as in Caywood, Jr.—U.S. Pat. No. 3,884,882 and Swiger, U.S. Pat. No. 4,147,740 and Gallucci et al., "Preparation and Reactions of Epoxy-Modified Polyethylene", J. APPL. POLY. SCI., V. 27, pp. 425–437 (1982) herein incorporated by reference. Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

Thermoplastic blends of polyamide with polycarbonate, poly(ester-carbonate) and/or polyarylate in any proportion will at least in some degree benefit from the present invention. However, as a practical matter, the benefits to such thermoplastic blends will not be measurably significant unless in each 100 weight parts thermoplastic resin there are at least 5 and preferably 20 weight parts polyamide and at least 5 and preferably 20 weight parts polycarbonate, poly(ester-carbonate) and/or polyarylate.

Epoxy functional materials suitable for use as the compatibilizing agent in the subject resin blends contain aliphatic or cycloaliphatic epoxy or polyepoxy functionalization. Generally, epoxy functional materials suitable for use herein are derived by the reaction of an epoxidizing agent, such as peracetic acid, and an aliphatic or cycloaliphatic point of unsaturation in a molecule. Other functionalities which will not interfere with an epoxidizing action of the epoxidizing agent may also be present in the molecule, for example, esters, ethers, hydroxy, ketones, halogens, aromatic rings, etc. A well known class of epoxy functionalized materials are glycidyl ethers of aliphatic or cycloaliphatic alcohols or aromatic phenols. The alcohols or phenols may have more than one hydroxyl group. Suitable glycidyl ethers may be produced by the reaction of, for example, monophenols or diphenols described in Formula I such as bisphenol-A with epichlorohydrin. Polymeric aliphatic epoxides might include, for example, copolymers of glycidyl methacrylate or allyl glycidyl ether with methyl methacrylate, styrene, acrylic esters or acrylonitrile.

Specifically, the epoxies that can be employed herein include glycidol, bisphenol-A diglycidyl ether, tetrabromobisphenol-A diglycidyl ether, diglycidyl ester of phthalic acid, diglycidyl ester of hexahydrophthalic acid, epoxidized soybean oil, butadiene diepoxide, tetraphenylethylene epoxide, dicyclopentadiene dioxide, vinylcyclohexene dioxide, bis(3,4-epoxy-6-methylcyclohexylmethyl) adipate, and 3,4-epoxycyclohexylmethyl-3,4-epoxycyclohexane carboxylate.

Suitable epoxy functionalized materials are available from Dow Chemical Company under the tradename DER-332, from Shell Oil Corporation under the tradenames Epon 826, 828, and 871; from Ciba-Giegy Corporation under the tradenames CY-182 and CY-183; and from Union Carbide under the tradename ERL-4221.

The epoxy functionalized materials are added to the thermoplastic blend in amounts effective to improve compatibility as evidenced by both visual and measured physical properties associated with compatibility. A person skilled in the art may determine the optimum amount for any given epoxy functionalized material. Generally, from about 0.01 to about 10.0 weight parts of the epoxy functional material should be added to the thermoplastic blend for each 100 weight parts thermoplastic resin. Preferably, from about 0.05 weight parts to about 5.0 weight parts epoxy functional material should be added.

Of course, in addition to other common and suitable thermoplastic resins, the thermoplastic blends herein may contain various impact modifiers, stabilizers, flame retardants, mold release agents, reinforcing agents, pigments, and the like. Many additives are widely used and recognized as suitable for use herein.

The thermoplastic blends of the present invention are simply prepared by standard techniques; for example, by simple melt blending or dry mixing and melt extruding at an elevated temperature. The extruded admixture is then molded into a piece of specific dimensions or further extruded into a film or sheet product.

DESCRIPTION OF SPECIFIC EMBODIMENTS

Further illustration of this invention is set forth in the following examples. There is no intention to limit the scope of the invention to merely what is shown.

EXAMPLES 1-13

Blends of polycarbonate (LEXAN 131 manufactured by General Electric Company, i.v.=0.595–0.640 dl/g in methylene chloride at 25° C.) and a series of nylons were prepared on a Werner Pfleiderer ZSK-28 twin screw extruder at temperatures ranging from 565°–585° F., the resins having been dried for 5-10 hours at 110° C. in a forced hot air oven. Half of the blends also contained ERL-4221 epoxy, a cycloaliphatic diepoxide commercially available from Union Carbide Corporation. The pelletized products were dried in an air circulating oven at 110° F. for 10 hours and then injection molded into ASTM test specimens on a 75 ton Newbury injection molding machine (temperatures shown in Table I). Physical properties were measured according to standard ASTM test procedures (Table II). Compression molded plaques (1/16 inch thick) were also prepared on a hydraulic press at 475° F. Solvent resistance for these compression molded samples was determined by measuring critical strains, $E_0$, using a Bergen elliptical strain jig and the procedure described by Kambour, et al., (*Macromolecules* 5, 335, 1972). Results are summarized in Table III.

TABLE I

| Molding Conditions | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Cylinder Temperature (°F.) | | | | | | | | | | | | | |
| Rear | 535 | 535 | 535 | 500 | 500 | 500 | 500 | 525 | 525 | 525 | 525 | 535 | 535 |
| Mid | 535 | 535 | 535 | 500 | 500 | 500 | 500 | 525 | 525 | 525 | 525 | 530 | 530 |
| Nozzel | 535 | 535 | 535 | 500 | 500 | 500 | 500 | 525 | 525 | 525 | 525 | 525 | 525 |
| Mold Temperature | 170 | 170 | 170 | 170 | 170 | 150 | 150 | 170 | 170 | 170 | 170 | 170 | 170 |
| Injection Pressure (psi) | 1500 | 1500 | 1500 | 1500 | 1500 | 1500 | 1500 | 1500 | 1500 | 1500 | 1500 | 1500 | 1500 |
| Cycle Time (sec) | 10 | 10 | 10 | 10 | 10 | 10 | 10 | 10 | 10 | 10 | 10 | 10 | 10 |

TABLE II

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Composition Weight % | | | | | | | | | | | | | |
| polycarbonate | 75 | 75 | 75 | 75 | 75 | 75 | 75 | 80 | 80 | 80 | 80 | 75 | 80 |
| nylon 6,6[1] | 25 | 25 | 25 | | | | | | | | | | |
| nylon, 6,I,T[2] | | | | 25 | 25 | | | | | | | | |
| nylon 6(3),T[3] | | | | | | 25 | 25 | | | | | | |
| ST901L resin[4] | | | | | | | | 20 | 20 | | | | |
| Bexloy APC 803 polyamide[5] | | | | | | | | | | 20 | 20 | | |
| nylon 6,I | | | | | | | | | | | | 25 | 20 |
| ERL-4221 (phr) epoxy | | 0.2 | 0.1 | | 0.2 | | 0.2 | | 0.2 | | 0.2 | 0.2 | 0.2 |
| Properties | | | | | | | | | | | | | |
| Tensile Strength (psi) | | | | | | | | | | | | | |
| Yield | No Yield | 9,500 | 9,200 | 8,400 | 10,500 | 10,100 | 10,400 | 9,200 | 9,200 | 9,000 | 9,000 | 10,100 | 10,200 |
| Break | 9,800 | 7,200 | 7,500 | 8,400 | 7,700 | 7,800 | 8,500 | 8,100 | 9,200 | 7,400 | 7,200 | 7,900 | 8,000 |
| Elongation (%) | | | | | | | | | | | | | |
| Yield | No Yield | 5.6 | 5.7 | 5.2 | 6.4 | 6.0 | 6.0 | 5.6 | 5.8 | 5.8 | 5.9 | 5.7 | 5.8 |
| Break | 5.1 | 10.2 | 46.3 | 17.8 | 46.7 | 12.7 | 43.2 | 63.0 | 78.8 | 14.2 | 17.2 | 30.6 | 49.5 |
| Izod Impact (ft-lbs/in) | | | | | | | | | | | | | |
| Unnotched | 17.03 | 23.03 | 39.64 | 37.27 | 39.64 | 39.64 | 39.64 | 39.64 | 39.64 | 39.64 | 39.64 | 39.64 | 39.64 |
| Notched | .50 | .64 | 1.12 | 1.28 | 1.57 | .62 | .80 | 1.09 | 1.22 | 1.02 | 1.09 | .99 | 1.07 |

TABLE II-continued

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| HDT @ 66 psi (°F.) | 248.0 | 242.6 | — | 278.2 | 277.2 | — | 268.0 | 273.7 | 275.5 | 277.6 | 279.4 | 273.0 | 273.3 |

[1]ZYTEL 101 resin, cystalline polyamide; E. I. DuPont
[2]ZYTEL 330 resin, amorphous polyamide; E. I. DuPont
[3]Trogamid T resin, amorphous polyamie; Dynamit Nobel
[4]E. I. DuPont, amorphous polyamide containing rubber impact modifier
[5]E. I. DuPont, amorphous polyamide containing rubber impact modifier

TABLE III

| | Critical Strain (%) | | |
|---|---|---|---|
| Example | Acetone | Toluene | Gasoline[2] |
| Control A[1] | .19 | .19 | .19 |
| 4 | .80 | .31 | .34 |
| 5 | .80 | .38 | .47 |
| 6 | .32 | .32 | .28 |
| 7 | .62 | .62 | .39 |

[1]Lexan 131 (General Electric)
[2]No lead Gasoline (Amoco)

EXAMPLES 14–17

Lexan 4701, a poly(ester-carbonate) manufactured by General Electric Company was blended with nylon 6(3),T, Trogamid T resin and nylon 6,I,T, Zytel 330 resin in a Werner Pfleiderer ZSK-28 twin screw extruder at temperatures ranging from 575°–610° F. Half of the blends also contained ERL-4221 epoxy, a cycloaliphatic diepoxide commercially available from Union Carbide Corporation. Physical properties and molding conditions for these blends are shown in Table IV. Solvent resistance data is summarized in Table V.

TABLE IV

| | Examples | | | |
|---|---|---|---|---|
| | 14 | 15 | 16 | 17 |
| Compensation (weight %) | | | | |
| poly(ester-carbonate) | 75 | 75 | 75 | 75 |
| nylon 6(3),T | 25 | 25 | | |
| nylon 6,I,T | | | 25 | 25 |
| ERL-4221 epoxy | | 0.2 | | 0.2 |
| Properties | | | | |
| Tensile Strength (psi) | | | | |
| Yield | 10,800 | 11,100 | 9,900 | 11,400 |
| Break | 8,300 | 8,600 | 6,900 | 8,900 |
| Elongation (%) | | | | |
| Yield | 7.1 | 7.1 | 4.2 | 7.1 |
| Break | 17.0 | 17.2 | 18.9 | 26.2 |
| Izod Impact (ft-lb/in) | | | | |
| Unnotched | 22.89 | 28.11 | 30.62 | 34.04 |
| Notched | .61 | .71 | .83 | 1.07 |
| HDT @ 66 psi (°F.) | — | 317.2 | 321.9 | 322.9 |
| Molding Conditions | | | | |
| Cylinder Temperature (°F.) | | | | |
| Rear | 530 | 530 | 530 | 530 |
| Mid | 530 | 530 | 530 | 530 |
| Nozzel | 525 | 525 | 530 | 530 |
| Mold Temperature (°F.) | 170 | 170 | 170 | 170 |
| Injection Pressure (psi) | 1500 | 1500 | 1500 | 1500 |
| Cycle Time (sec) | 10 | 10 | 10 | 10 |

TABLE V

| | Critical Strain (%) | | |
|---|---|---|---|
| Example | Acetone | Toluene | Gasoline[2] |
| Control B[1] | .40 | .19 | .28 |
| 14 | .50 | .31 | .65 |
| 15 | .52 | .32 | .65 |
| 16 | .55 | .27 | .50 |
| 17 | .55 | .42 | .65 |

[1]Lexan 4701 (General Electric)
[2]No lead Regular Gasoline (Amoco)

EXAMPLE 18

Example 7 was repeated except that EPON 828 epoxy, the diglycidyl ether of bisphenol A (Shell), was used instead of ERL-4221 epoxy. As in previous examples, the blend containing EPON 828 epoxy had improved mechanical properties relative to the same composition without the epoxide compatibilizer.

What is claimed is:

1. A thermoplastic blend consisting essentially of:
   (i) at least one aromatic polycarbonate resin, wherein the polycarbonate consists of recurring structural units of the formula:

$$-\left[O-D-O-\overset{O}{\underset{\|}{C}}\right]-$$

wherein D is a divalent aromatic radical of a dihydric phenol;
   (ii) at least one polyamide resin; and
   (iii) an effective compatibilizing amount of at least one epoxy functional agent selected from the group consisting of aliphatic epoxides and cycloaliphatic epoxides.

2. The blend of claim 1 wherein 100 weight parts thermoplastic resin mixture of (i) and (ii) comprises at least 5 weight parts of said polyamide and at least 5 weight parts of said aromatic polycarbonate resin.

3. The blend of claim 2 wherein said thermoplastic resin mixture of (i) and (ii) comprises at least 20 weight parts of said polyamide and at least 20 weight parts of said aromatic polycarbonate resin.

4. The blend of claim 1 which contains from about 0.01 to about 10.0 weight parts of said epoxy functional compatibilizing agent for each 100 weight parts of thermoplastic resin mixture of (i) and (ii).

5. The blend of claim 1 wherein said polyamide resin is selected from the group consisting of crystalline and amorphous polyamides.

6. The blend of claim 1 wherein said dihydric phenol is 2,2-bis-(4-hydroxyphenyl)propane.

* * * * *